Figures 1, 2:
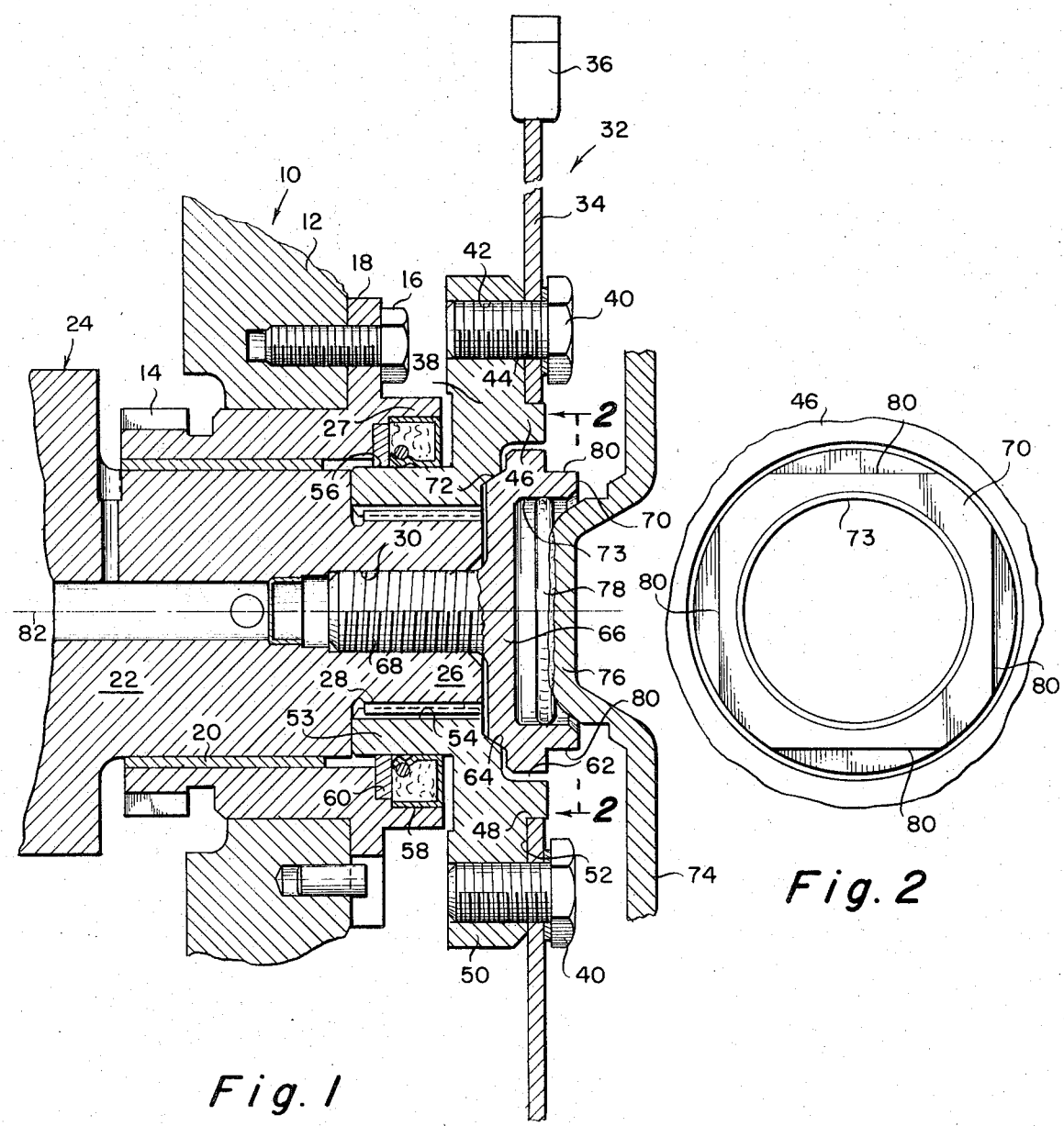

United States Patent [19]
Hufstader

[11] 3,845,622
[45] Nov. 5, 1974

[54] FASTENING MEANS ESTABLISHING CONCENTRICITY BETWEEN A VEHICLE FLYWHEEL, A FLUID CONVERTER AND AN ENGINE CRANKSHAFT

[75] Inventor: Gibson O. Hufstader, Utica, Mich.

[73] Assignee: General Motors Corporation, Detroit, Mich.

[22] Filed: Nov. 28, 1973

[21] Appl. No.: 419,902

[52] U.S. Cl. .......................... 60/330, 64/1, 74/573, 403/24, 403/258
[51] Int. Cl. ............................................ F16d 33/00
[58] Field of Search ........ 74/572, 573, 574; 403/13, 403/14, 258, 259, 260

[56] References Cited
UNITED STATES PATENTS
| | | | |
|---|---|---|---|
| 1,653,341 | 12/1927 | Chilton | 403/258 |
| 2,836,448 | 5/1958 | King | 403/258 |
| 2,961,892 | 11/1960 | Spannhake | 74/574 |

Primary Examiner—Samuel Scott
Assistant Examiner—F. D. Shoemaker
Attorney, Agent, or Firm—Charles R. Engle

[57] ABSTRACT

A retaining bolt for frictionally securing a flywheel to an end of a vehicle engine crankshaft while also piloting the flywheel and a fluid converter relative to the crankshaft. The bolt threadably engages a tapped hole in the end of the crankshaft and when tightened draws the flywheel securely onto a splined surface of the shaft. The bolt includes an enlarged head having a tapered surface engaging a like surface on the flywheel for precisely centering the flywheel relative to the crankshaft. The bolt head also contains a cavity snugly receiving and piloting a conventional torque converter centering disc whereby the flywheel, the fluid converter and the crankshaft are concentrically positioned.

3 Claims, 2 Drawing Figures

FASTENING MEANS ESTABLISHING CONCENTRICITY BETWEEN A VEHICLE FLYWHEEL, A FLUID CONVERTER AND AN ENGINE CRANKSHAFT

This invention relates to means for fastening a flywheel to an internal combustion engine crankshaft and more precisely to a fastening means which frictionally secures the flywheel to the crankshaft while simultaneously piloting the flywheel relative thereto and additionally provides means for piloting a fluid converter positioned adjacent the flywheel.

In vehicle internal combustion engine and drive assemblies it is common practice to secure a flywheel to an engine crankshaft adjacent an end thereof and connect a drive member of a fluid converter assembly thereto for providing a power input to an automatic vehicle transmission assembly. The connection of the flywheel to the crankshaft has necessarily required use of various types of locking means to positively secure the flywheel. Use of locking keys or lock washers requiring a tab to be bent over one of the members to lock them together has resulted in a problem of maintaining a desirable tolerance between the secured members and additionally often has required an undesirable increase in axial length of the connected members. With the advent of rotary internal combustion engines it has become necessary to find a positive and economical method for releasably securing a flywheel to an engine crankshaft. By virtue of the nature of a rotary engine, the crankshaft must be configured so that the end housing members can be slipped over the ends of the crankshaft and bolted in place to result in assembled engine housing. Therefore it is not possible to form the crankshaft with any substantial connecting flange or with an integral flywheel assembly because of this assembly requirement. A further difficulty involved in connecting a flywheel to an engine crankshaft and then subsequently connecting the drive member of a fluid converter to the drive train is the problem of precise concentricity between the assembled components. Slight deviation in concentricity between the connected parts, of course, results in undesirable vibration and unbalance characteristics during operation of the assembly.

This invention overcomes the aforementioned objections by providing a splined surface adjacent an end on the exterior of a crankshaft and by providing a tapped hole extending axially of the crankshaft in the end. A piloting and retaining bolt having an enlarged head, which can be of a diameter greater than the crankshaft itself so as to provide a greater contact area, includes a threaded shaft threadably received in the tapped hole. The flywheel includes a central aperture defined by an axially extending sleeve member either secured to the flywheel or formed integral therewith. The interior surface of the sleeve portion of the flywheel is internally splined to mate with the external splined surface on the crankshaft providing a driving connection therebetween. The flywheel includes a tapered annular surface facing outwardly from the engine crankshaft when the sleeve is assembled thereon. The annular tapered surface is of such a diameter to provide a substantial area of engagement with a like tapered surface formed on the enlarged head of the pilot and retaining bolt. The enlarged head of the bolt contains a relatively large cylindrical cavity facing in an axial direction opposite to that of the threaded shank of the bolt. A centering disc is secured to a projecting portion of the fluid converter driving member and has a diameter such that it snugly fits into the cylindrical cavity of the enlared bolt head. In this manner the fluid converter drive member is precisely positioned relative to the enlarged bolt head and consequently the axial axis of the crankshaft by virtue of the pilot bolt shank portion being threadably engaged within the tapped hole in the crankshaft. The enlarged bolt head further includes wrenching surfaces for engagement by a proper tool for tightening the bolt to the crankshaft end. Sufficient tightening of the bolt results in frictional engagement of the mating tapered surfaces between the flywheel and the enlarged bolt head so that the flywheel is positively frictionally retained in an attached position on the crankshaft. Further, the engagement of the mating tapered surfaces precisely pilots the position of the flywheel relative to the axis of the crankshaft so that the flywheel is mounted in a precise concentric relationship with the crankshaft. Further, the tightening of the enlarged bolt head against the flywheel stiffens the flywheel sleeve thereby preventing motion in the splined connection. In other words, the tightening of the enlarged bolt head against the flywheel is effective to remove any undesirable tolerance that may exist in the splined connection by virtue of the stiffening of the sleeve member.

Accordingly, an object of the present invention is the provision of a new and improved fastening means for securing a flywheel to a vehicle engine crankshaft.

Another object of the present invention is the provision of a fastening means for securing a flywheel to an end portion of an engine crankshaft while simultaneously piloting the flywheel relative to the crankshaft.

A further object of the present invention is the provision of a piloting and retaining bolt threadably received in a crankshaft end which simultaneously frictionally secures a flywheel assembly to the crankshaft and precisely pilots the flywheel relative thereto providing concentricity therebetween.

Another object of the present invention is the provision of a piloting and retaining bolt threadably received in the end of an engine crankshaft which also receives a flywheel assembly upon a splined portion thereof, the flywheel assembly including a sleeve portion having internal splines and providing an exterior bearing and sealing surface for rotatably supporting the flywheel relative to an engine housing surface.

Another object of the present invention is the provision of a fastening means including a splined surface on an end of an engine crankshaft, the crankshaft end also having a tapped hole in the end thereof, a piloting and retaining bolt assembly including a threaded shank received within the tapped hole, a flywheel including a sleeve portion having internal splines received upon the external splined portion of the crankshaft end providing a driving connection therebetween, the flywheel assembly also including an outwardly facing tapered surface, the enlarged bolt head including a mating tapered surface frictionally engaging the flywheel tapered surface upon tightening the bolt thereby locking the flywheel to the crankshaft while simultaneously piloting the flywheel in a concentric position relative to the axial axis of the crankshaft, the enlarged bolt head further including an outwardly facing cavity receiving a centering disc secured to a drive member of a fluid transmission so that positioning of the centering disc within the bolt head cavity precisely aligns the fluid converter relative to the aligned flywheel and the engine crankshaft in a concentric relationship, the assembled fastening means requiring a minimum of axial length connecting space.

The novel features which I believe to be characteristic of my invention are set forth with particularity in the appended claims. My invention itself, however, both as to its organization and method of operation, may be best understood by reference to the following description taken in connection with the accompanying drawings in which:

FIG. 1 is a fragmentary sectional plan view illustrating a flywheel assembly secured to an end of an engine crankshaft and frictionally retained thereon while being concentrically located to the crankshaft and the positioning of a centering disc secured to a fluid converter drive member for likewise being concentrically positioned relative to both the flywheel and the crankshaft in accordance with my invention.

FIG. 2 is a fragmentary end elevation view taken on line 2—2 of FIG. 1 to better illustrate the piloting and retaining bolt of my invention.

Referring now to FIG. 1, there is shown a fragment of a rotary internal combustion engine 10 including a housing end wall 12 having a fixed phasing gear 14 secured thereto by a plurality of machine bolts 16 engaging a flange 18. The phasing gear 14 is in the form of a sleeve and contains a bearing 20 receiving an end portion 22 of crankshaft 24. The phasing gear 14 also includes an axially extending flange 27 for a purpose later to be described. The crankshaft 24 terminates in an end portion 26 of a reduced diameter which has a splined external surface 28 as shown. The end portion 26 of crankshaft 24 contains a centrally located tapped hole 30.

A flywheel assembly 32 includes a relatively flexible annular web portion 34 having a predetermined weighted mass 36 secured to the outer periphery thereof. The web portion 34 is secured to a mounting collar or flange member 38 by a plurality of machine bolts 40 secured in threaded apertures 42 in the mounting collar 38 and which extend through apertures 44 and the web portion 34. The mounting collar 38 includes an axially extending flange 46 snugly received within central aperture 48 of the web portion 34 for aiding in the support of the web portion upon the mounting collar 38. The mounting collar 38 also includes a circumferentially radially extending flange 50 which overlies an area 52 of the web portion 34 for stiffening and supporting the web portion as illustrated. The mounting collar 38 further includes an axially extending sleeve portion or flange 53 having an internally splined surface 54 which engages the splined surface 28 on the terminal end 26 of crankshaft 24. The axially extending flange 53 also defines an outer circumferential surface 56 which provides for positioning of a seal assembly 58 between the sleeve flange 53 and the flange 27 of phasing gear 14 as shown. A secondary seal assembly 60 can be positioned adjacent the seal assembly 58 between the outer surface 56 of axially extending flange 53 and the flange 27 of phasing gear 14 to insure prevention of flow of oil externally of the engine past end housing member 12.

The mounting collar 38 is formed including a cylindrical cavity 62 having a tapered surface 64 formed therein. A piloting and retaining bolt 66 includes a threaded shank portion 68 threadably received and retained in tapped hole 30 of the terminal end 26 of the crankshaft. The piloting and retaining bolt 66 includes an enlarged bolt head 70 which has a tapered surface 72 mating with the tapered surface 64 formed in cylindrical cavity 62 of mounting collar 38. The enlarged bolt head 70 also contains a presized cylindrical cavity 73. A fluid converter coupling drive member 74, a fragment of which is shown, is formed including a projection or nose portion 76 which extends toward the crankshaft when the fluid converter member 74 is placed adjacent the flywheel assembly 32. The projection 76 has a centering disc 78 welded or otherwise secured thereto. The centering disc 78 is of a predetermined size snugly fitted within the cylindrical cavity 73 formed in the enlarged bolt head 70. The enlarged bolt head 70, as shown in FIG. 2, includes a plurality of wrench surfaces or flats 80 capable of being engaged by a proper tool for rotating the piloting and retaining bolt 66 and tightly securing the same within the tapped hole 30 in the crankshaft end 26.

From the above description it can readily be seen that the crankshaft 24 is assembled within the engine housing and the end housing member 12 along with the fixed phasing gear 14 are positioned over the end 22 of the crankshaft 24. The end housing member 12 is then secured in place completing the end assembly. The bearing 20 and the seal assemblies 58 and 60 are positioned within the phasing gear 14 underneath flange 27 and the internal splines 34 of sleeve portion 53 are aligned with the grooves in the external spline section 28 of crankshaft 24 and the flywheel assembly 32 is axially moved onto the crankshaft end. The shaft portion 68 of the piloting and retaining bolt 66 is then threadably engaged in tapped hole 30 and the enlarged bolt head 70 is rotated until the tapered surface 64 of mounting collar 38 frictionally engages the mating tapering surface 72 of the enlarged bolt head 70. The tapered surfaces 64 and 72 are brought into engagement until a predetermined force is applied so that the tapered surfaces are frictionally effective to positively lock the piloting and retaining bolt 66 in place secured to the end 26 of crankshaft 24. During the tightening movement of the piloting and retaining bolt 66 the engagement of the tapered surfaces 64 and 72 is effective to precisely position the flywheel assembly 32 relative to the axial axis 82 of crankshaft 24. The tightening of the nut 66 also stiffens the sleeve flange 53 of the mounting collar 38 providing a more rigid engagement of the splined surfaces 28 and 54. The stiffening of flange 53 reduces the tolerances existing between the splines and prevents any abnormal play therebetween so that the flywheel assembly 32 is precisely positioned on the crankshaft 24.

The protrusion 76 of the fluid converter drive member 74 and its affixed centering disc 78 are moved axially toward the cavity 73 in the nut 66 and in this manner by virtue of the snug fit between the centering disc 78 and the cavity 73, the fluid converter is concentrically positioned relative to the flywheel 32 and the axial axis 82 of crankshaft 24.

It is significant that the above described fastening arrangement provides for positively securing the flywheel assembly 32 to the end 26 of crankshaft 24 without any substantial increase in axial length between these members being required. In fact, by virtue of utilization of the pilot and and retaining bolt 66 a larger circumferential area of the tapered surface 72 is provided so that this particular area is not limited by the diameter of the crankshaft 24. Further, the positioning of the sleeve flange 52 of the crankshaft mounted collar 38 so that it partially extends within the fixed phasing gear 14 contributes to a reduction in axial length of the assembly. Likewise, taking advantage of the frictional engagement between the tapered surfaces 64 and 72 to frictionally lock the flywheel upon the crankshaft eliminates the necessity of any provision for an external or additional locking device which also contributes to maintaining a minimum axial length. The axial assembly length is further reduced by the fact that the centering disc 78 of the fluid converter drive member 74 is received within the cavity 73 formed in the enlarged bolt head 70. All of these features added together are significant to this invention is that they contribute to the provision of a minimum length fastening means which positively secures the flywheel upon the crankshaft while also assuring concentricity between the crankshaft, the flywheel and the fluid converter drive member.

While I have shown and described a specific embodiment of the present invention it will, of course, be understood that various modifications and alternative constructions thereof may be made without departing from the true spirit and scope of my invention and that I intend by the appended claims to cover all such modifications and alternative constructions as fall within the true spirit and scope of my invention.

I claim:

1. Fastening means establishing concentricity between a vehicle flywheel, a fluid converter and engine crankshaft comprising in combination: a crankshaft, an end of the crankshaft having a tapped hole therein; a splined surface on the exterior of said crankshaft adjacent said end; a flywheel having a centrally located aperture therein defined by an axially extending sleeve; said sleeve having an internal splined surface mating with and receiving the splined surface on said crankshaft providing a driving connection therebetween; an annular outwardly facing tapered retaining and piloting surface on said flywheel; a pilot and retaining bolt; a threaded shank on said bolt for engagement with the tapped hole in said crankshaft end, an enlarged head on said bolt, an annular tapered retaining and piloting surface on said bolt for engagement with said tapered surface on said flywheel, said tapered surfaces frictionally engaging and locking said bolt to said flywheel when said bolt is tightened thereagainst, said bolt head having a relatively large cavity in said enlarged head facing a direction axially opposite to that of said threaded shank; a fluid converter, centering means secured to and projecting outwardly from said fluid converter, said centering means having a size slightly less than that of the cavity in said enlarged bolt head, and a plurality of flat wrench surfaces on said bolt head whereby tightening of said bolt shank in the tapped hole in said crankshaft end draws mating tapered retaining and piloting surfaces into engagement frictionally locking and securing said flywheel to said crankshaft while simultaneously piloting the flywheel relative thereto and receipt of said fluid converter centering means within the cavity in said enlarged bolt head piloting said fluid converter relative to said crankshaft thereby establishing concentricity between the engaged crankshaft, flywheel and fluid converter.

2. Fastening means establishing concentricity between a vehicle flywheel, a fluid converter and an engine crankshaft comprising in combination a crankshaft, and end of the crankshaft having a tapped hole therein; a splined surface on the exterior of said crankshaft adjacent said end; a flywheel having a centrally located aperture therein; a mounting collar having an axially extending annular flange fitted into said central aperture and further having a circumferential radially extending flange of a diameter greater than the axial flange, said circumferential flange overlying a portion of said flywheel for support thereof and providing a surface for connecting said flywheel to said mounting collar, a sleeve portion on said collar extending in a direction opposite to said axial flange and having a diameter less than that of said axial flange, said sleeve portion having an internally splined surface mating with said crankshaft splined surface providing a driving connection therebetween, said mounting collar having an annular outwardly facing conically tapered retaining and piloting surface thereon; a retaining and pilot bolt, a threaded shank on said bolt for engagement with a tapped hole in said crankshaft end, an enlarged head on said bolt, an annular conically tapered retaining and piloting surface facing toward said threaded shank on said bolt for engagement with said mounting collar tapered surface and frictionally locking said bolt to said collar when said bolt is tightened thereagainst, said bolt head having a relatively large cylindrical cavity in said enlarged head facing a direction axially opposite to that of said threaded shank; a fluid converter having a projecting surface, a circular centering disc secured to said projecting surface of said fluid converter and having a diameter slightly less than the diameter of said bolt head cylindrical cavity; and a plurality of flat wrench surfaces on said bolt head whereby tightening of said bolt shank in said crankshaft end draws said mating bolt and mounting collar tapered surfaces into frictional locking engagement securing said flywheel to said crankshaft while simultaneously piloting said flywheel relative to said crankshaft and receipt of said fluid converter centering disc within said bolt head cylindrical cavity piloting said fluid converter relative to said crankshaft thereby establishing precise concentricity between said crankshaft, said flywheel and said fluid converter.

3. Fastening means establishing concentricity between a vehicle flywheel, a fluid converter and an engine crankshaft permitting connection of the flywheel to the crankshaft after an engine end housing member has been assembled over an end of the crankshaft comprising in combination: a crankshaft, an end of the crankshaft having a threaded tapped hole therein; a splined surface on the exterior of said crankshaft adjacent said end; a flywheel having a centrally located aperture therein, an axially extending sleeve integral with said flywheel and defining the aperture therein, said sleeve having an internal splined surface mating with and receiving the splined surface on said crankshaft providing a driving connection therebetween, the external surface of said sleeve providing a bearing and sealing surface between said end housing member and said sleeve whereby the flywheel is supported for rotation relative to said end housing member; an annular outwardly facing tapered retaining and piloting surface on said flywheel; a pilot and retaining bolt; a threaded shank on said bolt for engagement with the tapped hole in said crankshaft end, an enlarged head on said bolt, an annular tapered surface on said bolt head facing toward said threaded shank for engagement with the tapered surface on said flywheel and frictionally locking said bolt to said flywheel when said bolt is tightened thereagainst, the tapered surface piloting said flywheel relative to said crankshaft as said bolt is tightened within the end of said crankshaft by virtue of the mating engaged tapered surfaces, the tightening of said bolt on the end of said crankshaft into engagement with said flywheel also precisely aligning the flywheel on the exterior splined surface of said crankshaft whereby the play in the splined connection between said crankshaft and said flywheel is substantially reduced; said bolt head having a relatively large cylindrical cavity in said enlarged head facing a direction axially opposite to that of said threaded shank; a fluid converter, a circular centering disc, said fluid converter including a projecting surface extending axially toward the end of said crankshaft when placed adjacent thereto, said circular centering disc secured to said projecting surface of said fluid converter and having a diameter slightly less than the diameter of said bolt head cylindrical cavity; and a plurality of flat wrench surfaces on said bolt head whereby tightening of said bolt shank in said crankshaft end draws said mating tapered annular bolt and flywheel surfaces into frictional locking engagement positively securing said flywheel to said crankshaft while simultaneously piloting said flywheel relative thereto and receipt of said fluid converter center disc within said bolt head cylindrical cavity precisely piloting said fluid converter relative to said crankshaft and said flywheel thereby establishing concentricity between the engaged members.

* * * * *